United States Patent Office 2,773,753
Patented Dec. 11, 1956

2,773,753

PROCESS FOR PRODUCING AMMONIUM NITRATE OF ANY DESIRED SIZE PARTICLE

Leonard A. Stengel, Terre Haute, Ind., assignor to Commercial Solvents Corporation, Terre Haute, Ind., a corporation of Maryland No Drawing. Application January 6, 1953, Serial No. 329,923

1 Claim. (Cl. 23—313)

My invention relates to ammonium nitrate production and more particularly, it relates to the production of solid ammonium nitrate of any desired particle size.

Until recently, there were several known processes for producing ammonium nitrate among which were the Prilling process, the high-pan graining process, the Oslo crystal process, etc. In all of these processes, ammonium nitrate of a very small particle size is produced. For example, in the Prilling process where molten ammonium nitrate is sprayed from the top of a Prilling tower and allowed to fall through the tower countercurrently to a stream of air, spherical ammonium nitrate particles of a size ranging from about 20 to about 40 mesh are produced. In the high-pan graining process, molten ammonium nitrate is allowed to crystallize in a vat forming small needle-shaped crystals, the final particles of which are of a size corresponding to from about 20 to about 150 mesh. In the Oslo crystal process the small, needle-like crystals of ammonium nitrate are allowed to grow to produce a larger particle size but the maximum sized particles produced by this process range from about 30 to about 120 mesh. Thus it can be seen that all known previous processes for producing ammonium nitrate were able only to produce very small particles of this important nitrogen source.

Experience with the small-sized ammonium nitrate products described above has shown that the small size has serious disadvantages in the fertilizer field. For example, it has been found that the small size ammonium nitrate products are very difficult to mix with other granular fertilizer materials such as superphosphate, potash muriate, etc. It has also been found that when conventional fertilizer applicators are employed, it is very difficult to adjust the rate of application of the ammonium nitrate when the material is of the extremely small size described above. Furthermore it has been found that the small particle ammonium nitrate materials tend to form a wet mush in humid weather making the material extremely difficult to handle and impossible to spread as a fertilizer.

I have now discovered a means for making solid ammonium nitrate of any desired size particle consistent with the recognized utility of ammonium nitrate. I am, therefore, able to produce solid ammonium nitrate having a much larger particle size than ammonium nitrate produced by prior processes and thus am able to produce a material close to the size of other granulated fertilizers making mixing of ammonium nitrate with such granulated fertilizers quick and convenient. Furthermore, the larger size material facilitates the adjustment of the rate of application of ammonium nitrate to soil when the usual fertilizer applicators are employed. In addition, the larger size ammonium nitrate particles do not tend to form a wet mush in humid weather as readily as ammonium nitrate Prill's or small crystals or other small size particles.

My invention consists essentially of flowing molten ammonium nitrate onto a moving, flat endless belt whereon cooling of the ammonium nitrate is effected to produce a sheet of solid ammonium nitrate which sheet of solid ammonium nitrate is then broken up into particles of any desired size.

Because of the tendency of ammonium nitrate to decompose at or above its melting point, it has heretofore been considered too hazardous to utilize molten ammonium nitrate for the production of solid ammonium nitrate. The hazard surrounding the use of molten ammonium nitrate has been amplified by the fact that the only processes available for producing molten ammonium nitrate necessarily require the provision of large amounts of ammonium nitrate in the molten state at any particular time. With the advent of my process for producing ammonium nitrate described in the U. S. Patent 2,568,901, however, molten ammonium nitrate can be continuously produced and continuously removed from the reactor as rapidly as it is produced in the molten state. Thus no large volumes of molten ammonium nitrate are accumulated at any one time but, at the same time, there is a continuous source of the molten material.

As described above, I flow the molten ammonium nitrate onto a moving flat belt. While I can conduct the molten ammonium nitrate directly from the reactor employed in the process described in U. S. Patent 2,568,901 to the said flat moving belt, I prefer to pass the molten material from the reactor through a steam separator and then to the flat moving belt. The flat, moving belt can be of any suitable, corrosion-resistant material such as for example Teflon, a suitable metal, etc. I prefer to employ a stainless steel belt. The molten ammonium nitrate which is flowed onto the flat, moving belt is, of course, above the melting point which for pure ammonium nitrate is about 337° F.

Merely flowing the molten ammonium nitrate onto the flat, moving belt at ordinary room temperature is sufficient to cause solidification of the molten ammonium nitrate. I have found, however, that the sheet of solid ammonium nitrate produced on the flat, moving belt is pliable and somewhat sticky if the temperature of the sheet is above about 200° F. and consequently I prefer to effect cooling of the sheet of ammonium nitrate to a temperature below about 200° F. in order to facilitate subsequent granulation which operation is considerably hampered if the sheets of solid ammonium nitrate is pliable and sticky when it is granulated. To effect cooling of the ammonium nitrate to a temperature below about 200° F. I can employ a cooling medium such as for example, air flowing over the sheet of ammonium nitrate on the flat, moving belt or I can use cooling water in contact with the under side of the moving belt or I can merely allow the ammonium nitrate to solidify and cool under atmospheric conditions which latter means would require a considerably longer flat, moving belt than would be required when a cooling medium is employed.

The thickness of the sheet of solid ammonium nitrate on the flat, moving belt is controlled by varying the rate of flow of the molten ammonium nitrate onto the belt and by varying the speed at which the belt is moved. Control of the width of the sheet of solid ammonium nitrate produced can be facilitated by the use of an edge on the flat, moving belt and the utilization of an edge provides for a sheet of uniform thickness from edge to edge. It is advantageous to produce a sheet of solid ammonium nitrate with a thickness equivalent to the desired particle size after granulation of the sheet of solid ammonium nitrate. This reduces the granulation necessary to produce a product of the desired particle size. Generally, I have found it desirable to produce a sheet of solid ammonium nitrate having a thickness of from about 1/16 to about 3/16 of an inch depending upon the exact particle size of the granulated product which is desired. However I am able, by my process, to produce sheets of solid ammonium nitrate having a thickness less than about 1/16 inch or greater than 3/16 of an inch.

Following the production of the flat sheet of solid ammonium nitrate, I then granulate the solid ammonium nitrate to any desired particle size. Any convenient means can be employed for conducting the solid sheet of ammonium nitrate from the moving belt on which the sheet is formed to the granulation equipment. It is, of course, preferable to so place the granulation equipment that the sheet of solid ammonium nitrate can be fed thereto directly from the end of the flat, moving belt. The granulator which I employ in my process can be any of the conventional devices for reducing the size of solid materials such as for example, a hammer mill, a roller mill, a granulator with rotating blades having a knife edge providing a shearing action, a granulator having paddle wheel blades to provide a crushing action, etc. I prefer to employ a granulator of the type having a screened outlet so that the product is reduced to a size below any desired maximum, particles which will not pass through the screen being further granulated to produce particles of a size which will pass through the screen. By granulating ammonium nitrate in the above-described manner employing a six mesh wire screen on the granulator outlet, I am able to produce a granular ammonium nitrate product having a particle size such that less than 6% by weight will pass through a 20 mesh screen.

The following examples are offered to illustrate my invention but I do not intend to be limited to the particular procedures described, it being my intention to include equivalents evident to those skilled in the art within the scope of my invention as described in this specification and the attached claim.

EXAMPLE I

Molten ammonium nitrate at the rate of 452 lbs. per hour having a temperature of 393° F. was flowed onto a flat, stainless steel endless belt moving at the rate of 8.18 feet per minute over an effective surface length of 17 feet. Water at a rate of 6,210 lbs. per hour was circulated in contact with the underside of the flat, moving belt in a bed extending under the first 6 feet of the belt length, the temperature of the water entering the bed being 138° F. The molten ammonium nitrate solidified on the belt into a sheet 13½ inches wide and ⅛ of an inch thick. The solid ammonium nitrate was run off the end of the belt into a granulator consisting of a paddle-wheel type crusher rotating at 87 R. P. M. in a confined space, the granulator outlet consisting of a 4 mesh screen with a wire diameter of 0.081 inch. The temperature of the solid ammonium nitrate entering the granulator was 150° F. The screen analysis of the product is shown in the following table.

Table I

PRODUCT SCREEN ANALYSIS

| Retaining screen mesh: | Percent by weight |
|---|---|
| −4+6 | 41.4 |
| −6+10 | 40.3 |
| −10+20 | 11.5 |
| −20 | 6.8 |

EXAMPLE II

Molten ammonium nitrate at a temperature of 342° F. was flowed onto a flat, moving, stainless steel endless belt at the rate of 285 lbs. per hr., the endless belt being the same as described in Example I. The water rate to the cooling bed was 5,150 lbs. per hr. and the water had a temperature of 146.5° F. The belt speed was 10.2 feet per minute and the sheet of solid ammonium nitrate produced was 6¼ inches wide and ⅛ of an inch thick. The solid ammonium nitrate at a sheet temperature of 186° F. was conducted to a granulator of the same type as that described in Example I except that the outlet was through a 6 mesh screen having a wire diameter of 0.040 inch. The screen analysis of the product is shown in the following table.

Table II

PRODUCT SCREEN ANALYSIS

| Retaining screen mesh: | Percent by weight |
|---|---|
| −6+10 | 82.8 |
| −10+14 | 7.0 |
| −14+20 | 4.9 |
| −20 | 5.3 |

Now having described my invention what I claim is:

A continuous process of producing solid granular ammonium nitrate of predetermined particle size which comprises continuously depositing a stream of molten ammonium nitrate on the top of a flat, moving, endless cooling surface, controlling the rate of flow of the molten ammonium nitrate and the speed of the cooling surface so that the molten mass solidifies in the form of a sheet having a thickness ranging from about 1/16 to 3/16 of an inch and corresponding substantially to the particle size desired in the granular product, cooling the said sheet to a temperature below 200° F. and then crushing and granulating the sheet to an average particle size ranging from about 1/16 to 3/16 of an inch and corresponding substantially to the thickness of said sheet.

References Cited in the file of this patent

UNITED STATES PATENTS

| 321,636 | Penniman | July 7, 1885 |
| 1,263,363 | Bergve et al. | Apr. 23, 1918 |
| 1,312,430 | Benjamin | Aug. 5, 1919 |
| 1,467,867 | Bauch | Sept. 11, 1923 |
| 1,653,390 | Coltman | Dec. 20, 1927 |
| 2,115,851 | Handforth et al. | May 3, 1938 |
| 2,166,579 | Cairns | July 18, 1939 |
| 2,402,192 | Williams et al. | June 18, 1946 |

OTHER REFERENCES

Industrial and Engineering Chemistry, Production of Grained Ammonium Nitrate Fertilizer, Phillip Miller et al., Vol. 38, No. 7, July 1946, pages 709–718.